United States Patent
Givler

Patent Number: 6,062,249
Date of Patent: May 16, 2000

[54] FAUCET SIDE SPRAY DIVERTER

[75] Inventor: John D. Givler, Avon Lake, Ohio

[73] Assignee: Moen Incorporated, North Olmsted, Ohio

[21] Appl. No.: 09/210,705

[22] Filed: Dec. 14, 1998

[51] Int. Cl.$^7$ .............................. F16K 11/00; F16K 31/14
[52] U.S. Cl. ........................................................ 137/119.04
[58] Field of Search .......................... 137/119.03, 119.04, 137/119.05, 597; 239/106

[56] References Cited

U.S. PATENT DOCUMENTS

| | | | |
|---|---|---|---|
| 2,769,454 | 11/1956 | Bletcher et al. | 137/119.04 |
| 2,998,824 | 9/1961 | Ward | 137/119.04 |

*Primary Examiner*—Stephen M. Hepperle
*Attorney, Agent, or Firm*—Dorn, McEachran, Jambor & Keating

[57] ABSTRACT

A faucet diverter to be mounted within a portion of a water faucet assembly for controlling water flow to either a faucet spout or a spray discharge includes a body, a chamber within the body, and a water inlet opening into the chamber. There is a spout outlet and a spray outlet connected to the chamber and there is an orifice in the body between the chamber and the spout outlet. A poppet is movable within the body chamber and carries a cone seal adjacent one end to control flow through the orifice to the spout outlet. There is a cup seal carried by the other end of the poppet to control flow to the spray outlet. The cup seal has an outwardly-extending lip formed and adapted to be in contact with a wall of the chamber and the cup seal has a generally annularly disposed recess at the end away from the lip. There are a plurality of outwardly extending projections on the exterior of the cup seal, bearing against the chamber wall, and being located generally in alignment with the recess. The cup seal is formed of an elastomeric material which distorts under pressure from water within the chamber, with the result that water pressure in the recess causes distortion of the cup seal toward the chamber wall between the cup seal projections.

7 Claims, 2 Drawing Sheets

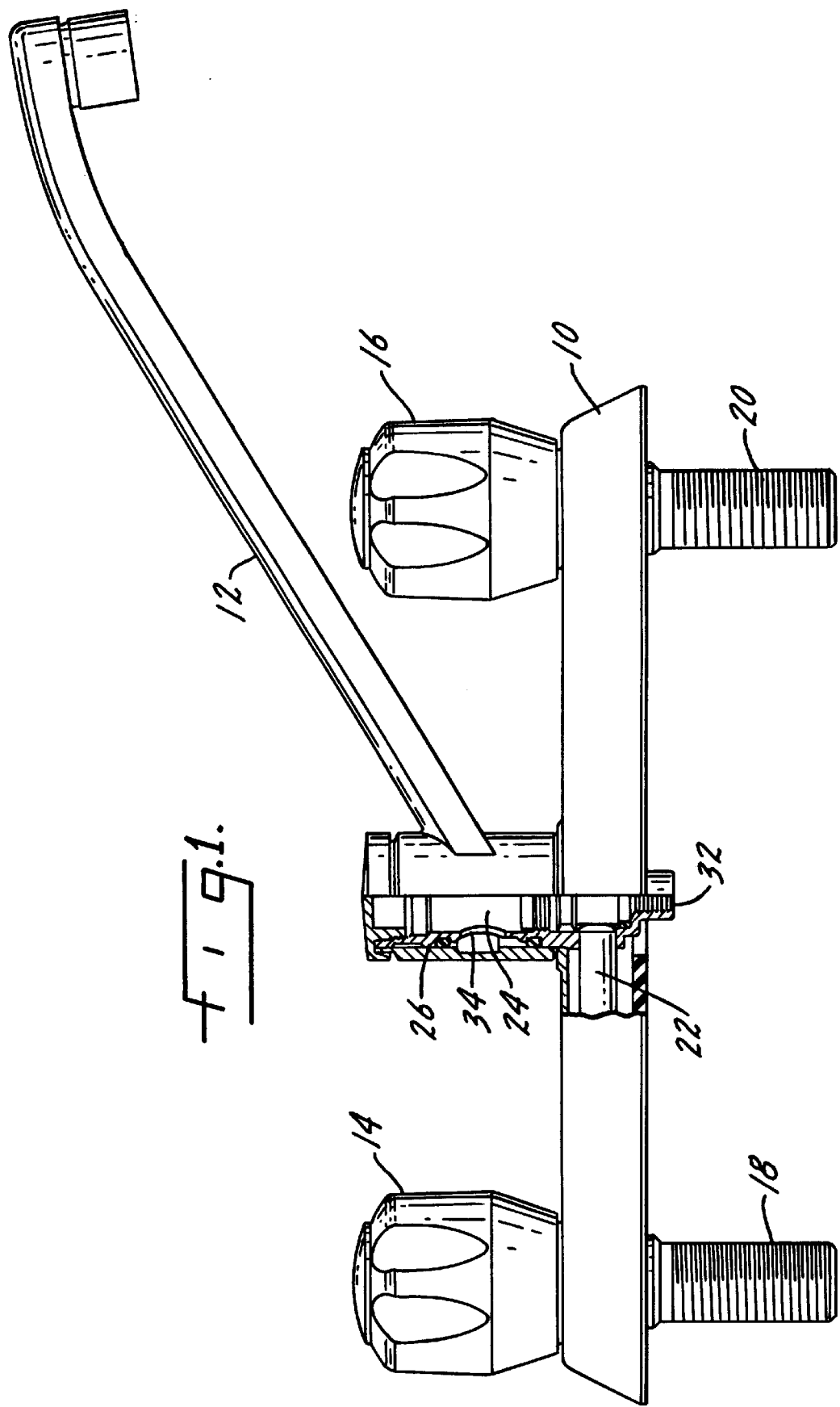

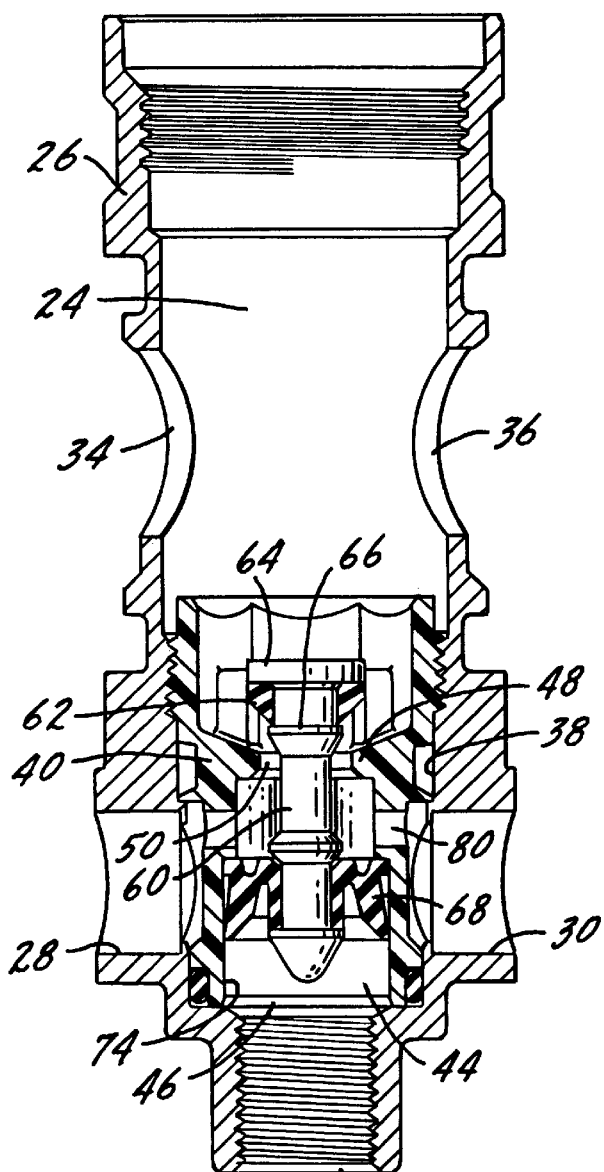
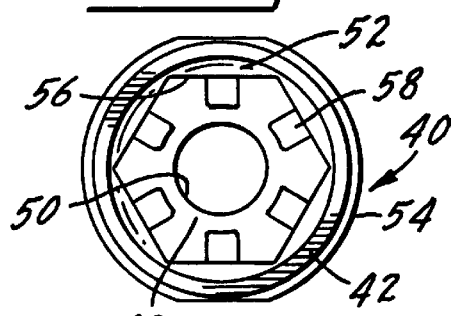
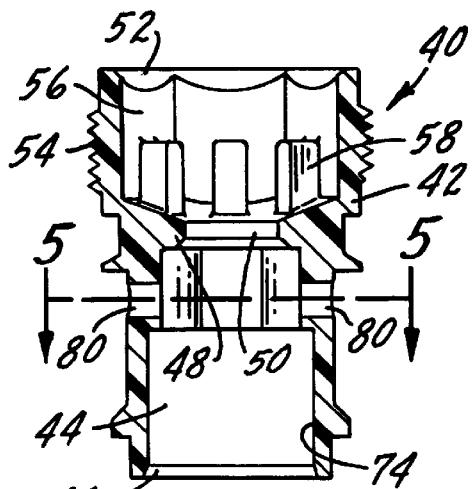
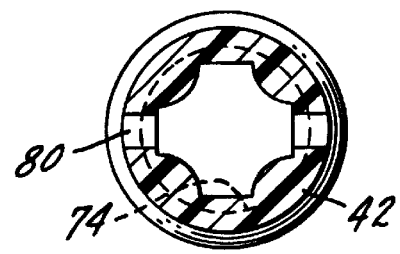
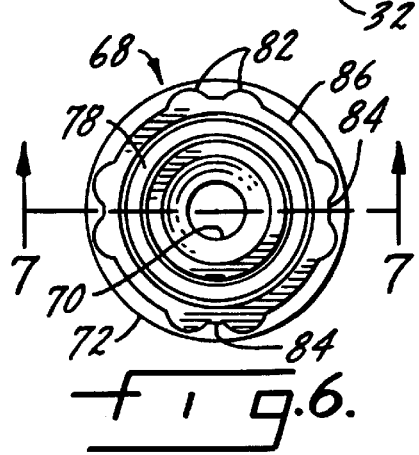
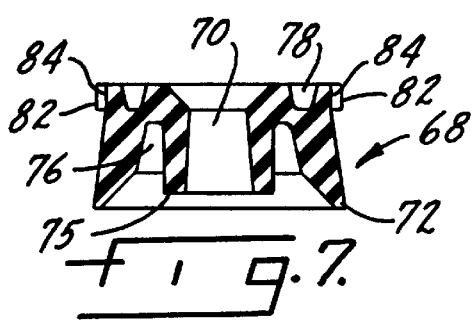

FAUCET SIDE SPRAY DIVERTER

THE FIELD OF THE INVENTION

The present invention relates to faucet diverters of the type used to direct water either to the faucet spout or to what is customarily called a side spray. A problem which is often encountered in side spray diverters of the type disclosed herein is to insure that there will be no shared water between the faucet spout and the side spray when the spray is operated. The invention herein is specifically directed to a diverter which will maintain a tight seal at the spout outlet when the spray is operated, throughout the range of operating pressures customarily found in residential water supplies.

The present invention accomplishes the objective described above by the use of a uniquely formed cup seal which is normally facing the side spray discharge of the diverter. The cup seal has an annular recess facing upstream and there are a series of projections extending outwardly from the side of the cup seal and which bear against the wall of the diverter chamber. Water pressure within the annular recess will cause the rubber or elastomer of the cup seal to distort toward the wall of the diverter chamber between the projections, thus maintaining pressure at the upstream side of the seal. The distortion is not such as to prevent the passage of water around the outside of this portion of the cup seal, but to limit flow and control pressure. Thus, the combination of the recess and the projections provide a variable orifice at the upstream side of the cup seal. The variable orifice concept is necessary in a diverter of this type to insure satisfactory performance of the diverter through a complete range of water pressures and through the range of manufacturing tolerances which traditionally accompany a product of this size and shape.

SUMMARY OF THE INVENTION

The present invention relates to faucet diverters and more specifically to a faucet diverter which meets all existing codes and regulations and can be manufactured at a minimum expense within reasonable tolerances.

A primary purpose of the invention is to provide a faucet side spray diverter assembly of the type described which will maintain a seal preventing flow to the non-selected water discharge, either the faucet spout or the side spray, through a complete range of water pressures conventionally found in a residential environment.

Another purpose of the invention is to provide a side spray diverter which may be economically manufactured at reasonable tolerances, but yet one which will operate in the desired manner to prevent shared water.

Another purpose is a side spray diverter of the type described which uses a variable orifice to maintain control of the pressure differential across the diverter cup seal.

other purposes will appear in the ensuing specification, drawings and claims.

BRIEF DESCRIPTION OF THE DRAWINGS

The invention is illustrated diagrammatically in the following drawings wherein:

FIG. 1 is a front view, in part section, of a two handle faucet illustrating a side spray diverter in the faucet assembly;

FIG. 2 is an enlarged section of the faucet housing illustrating the side spray diverter positioned between the spout discharge and the spray discharge;

FIG. 3 is an axial section through the diverter body;

FIG. 4 is a top view of the diverter body;

FIG. 5 is a section along plane 5—5 of FIG. 3;

FIG. 6 is a top view of the diverter cup seal; and

FIG. 7 is a section along plane 7—7 of FIG. 6.

DESCRIPTION OF THE PREFERRED EMBODIMENT

In FIG. 1, there is indicated a typical two-handle faucet which has a base or escutcheon 10 and a spout 12. The handles 14 and 16 are used to control water flowing from the inlet conduits 18 and 20, through water pipes, one of which is indicated at 22, into a central chamber 24 in the spout hub 26.

The spout hub and the diverter are shown in greater detail in FIGS. 2–7. The hub 26 includes a pair of water inlet ports 28 and 30, one for hot water and one for cold water. The hub 26 further includes a spray outlet 32, generally at the lower end thereof and shown also in FIG. 1, and outlets 34 and 36 adjacent the upper portion of the hub, which outlets will be in communication with the spout 12. Thus, water flows into the hub diverter chamber 38 through the inlet ports 28 and 30 and may flow outwardly to either the spray or the spout, as determined by the operation of the diverter indicated generally at 40.

The diverter 40 includes a body 42 having an interior diverter chamber 44. The chamber 44 is open at the bottom, as at 46, and thus the chamber is in communication with the spray outlet 32. There is an inwardly directed annular seat 48, generally midway of the diverter body 42, which defines an orifice 50 that is in communication with the diverter spout outlet 52. The diverter body may have exterior threads 54 for use in fastening the diverter body within the hub 26.

Between the orifice 50 and the spout outlet 52 the diverter body includes a hex-shaped area 56 to receive a tool to install the diverter within the hub 26. There are also a plurality of guide vanes 58 which function to control the movement of the diverter poppet 60 as it moves between positions in which there is either a spout discharge or a spray discharge.

The poppet 60 has a cone-shaped seal 62 which is captured between a shoulder 64 at the upper end of the poppet and a smaller shoulder 66. The cone-shaped seal is adapted to close upon the seat 48 and thus preclude passage of water through the orifice 50 to the spout discharge.

The spray end of the poppet 60 includes a cup-shaped seal 68 shown in detail in FIGS. 6 and 7. The cup-shaped seal 68 has a bore 70 by which the seal 68 is fastened to the poppet 60. There is an outwardly-extending annular lip 72 which will be in contact with the interior wall 74 of the chamber 44 to prevent backflow. There is an annular portion 75 of the cup-shaped seal 68 which defines the bore 70 and there is a groove 76 between the portion 75 and the outwardly extending flexible lip 72.

At the top or upstream end of the cup-shaped seal 68 there is an annular truncated V groove or recess 78 which will be subject to water pressure from the inlets 28 and 30 and thus water pressure within the chamber 44. Water from the inlets 28 and 30 will reach the interior of the diverter body, and thus the chamber 44, through openings 80 formed in the diverter body. In general axial alignment with the recess 78 are a plurality of outwardly-extending projections or annular bumps 82 shown particularly in FIG. 6. The bumps 82 are non-uniformly circumferentially disposed about the exterior of the cup-shaped seal 68 and are arranged in pairs. The space 84 between each bump in a pair is substantially less than the space 86 between pairs of bumps. This is important in that the cup-shaped seal is formed of an elastomeric distortable material and the combination of the recess 78 and bumps 82 will provide what is in effect a variable orifice for water to flow about the exterior of the cup-shaped seal. There will be substantially more distortion of the body of the cup-shaped seal, caused by water pressure within recess 78, in the area 86 between the pairs of bumps than there will be distortion in the area 84 between the bumps in a pair. Thus, distortion will narrow the opening between the exterior of the cup-shaped seal and the wall 74 of chamber 44, but there will not be complete closure. Such a variable orifice is necessary to maintain the pressure drop across the cup-shaped seal at the array of line pressures commonly found in residential plumbing. The variable orifice will prevent what is called "shared water," which is a situation in which a portion of the water will be discharged through the spout, even when the spray has been triggered.

In operation, the normal position of the diverter will be such that the cone seal 62 will be away from the seat 48, as illustrated in FIG. 2. The spray will be inoperable and the water within the hose leading from the spray outlet 32 to the spray will be filled with water and so any water flowing into the faucet hub 26 will pass through the diverter, out the openings 34 and 36 to the spout. When the spray is operated, the immediate change of pressure within the hose leading to the spray will cause the poppet to move rapidly downwardly so the cone-shaped seal will close upon the seat 48. Water will then flow exteriorly about the cup-shaped seal, through the spaces between the bumps 82 and the wall of the diverter chamber 44, and then out through the spray discharge 32. The lip 72 will flex inwardly to permit water flow. It is important to maintain a pressure differential across seal 68 to retain seal 62 on its seat 48. Otherwise, there will be water flow through both the spout and the spray, e.g. shared water. The variable orifice formed by the recess 78 and the particular spacing of the projections or annular bumps, taken with the distortion capability of seal 68, will insure that the water passage about the exterior of seal 68 will vary with pressure. This will maintain an adequate pressure differential on the upstream side of seal 68 to maintain cone seal 62 on seat 48.

The specific disposition and location of the bumps has been found to be particularly advantageous in that it allows the diverter to be made without the necessity of extremely close manufacturing tolerances. This permits a lower cost for the manufacture of the diverter, but yet provide a diverter which will reliably perform its intended function.

Whereas the preferred form of the invention has been shown and described herein, it should be realized that there may be many modifications, substitutions and alterations thereto.

The embodiments of the invention in which an exclusive property or privilege is claimed are defined as follows:

1. A faucet diverter to be mounted within a portion of a water faucet assembly and for controlling water flow to either a faucet spout or a spray discharge, said diverter including a body, said body having a chamber and an inlet opening into said chamber, a spout outlet in said body in communication with said chamber, a spray outlet in said body in communication with said chamber, an orifice in said body between said chamber and said spout outlet, a poppet movable within said body chamber, a cone seal carried by said poppet adjacent one end thereof to control flow through said orifice to said spout outlet, a cup seal carried by said poppet adjacent the opposite end thereof to control flow to said spray outlet, said cup seal having an outwardly-extending lip portion formed and adapted to be in contact with a wall of said chamber, said cup seal having a generally annularly disposed recess means at the upstream end thereof, said recess means being in constant communication with said inlet, and a plurality of outwardly-extending projections on the exterior of said cup seal, said projections bearing against said chamber wall and being located generally in alignment with said recess means, said cup seal being formed of an elastomeric material which distorts under pressure from water within said chamber, with water pressure within said recess means causing distortion of said cup seal between at least some of said projections toward said chamber wall.

2. The faucet diverter of claim 1 wherein said recess means is an annular continuous recess.

3. The faucet diverter of claim 1 wherein said projections are in the form of annular bumps.

4. The faucet diverter of claim 1 wherein said projections are circumferentially non-uniformly spaced.

5. The faucet diverter of claim 4 wherein said projections are arranged in pairs, with the space between projections in a pair being less than the space between pairs of projections.

6. The faucet diverter of claim 5 wherein the distortion of said cup seal by water pressure from within said recess means is greater in the space between pairs of projections than in the space between projections in a pair.

7. The faucet diverter of claim 1 wherein said cup seal has a bore for said poppet, and a downstream facing groove adjacent said lip seal, with said groove surrounding said poppet bore.

* * * * *